United States Patent
Mal et al.

(10) Patent No.: US 10,417,582 B2
(45) Date of Patent: Sep. 17, 2019

(54) METHOD AND DEVICE FOR AUTOMATING OPERATIONAL TASKS IN AN ENTERPRISE NETWORK

(71) Applicant: Wipro Limited, Bangalore (IN)

(72) Inventors: Jayanta Kumar Mal, Bangalore (IN); Gary Alan Chandler, Reading (GB)

(73) Assignee: Wipro Limited, Bangalore (IN)

( * ) Notice: Subject to any disclaimer, the term of this patent is extended or adjusted under 35 U.S.C. 154(b) by 383 days.

(21) Appl. No.: 15/461,122

(22) Filed: Mar. 16, 2017

(65) Prior Publication Data
US 2018/0217867 A1    Aug. 2, 2018

(30) Foreign Application Priority Data

Jan. 27, 2017 (IN) .............................. 201741003006

(51) Int. Cl.
G06F 9/44 (2018.01)
G06Q 10/00 (2012.01)
H04L 29/08 (2006.01)

(52) U.S. Cl.
CPC .............. G06Q 10/00 (2013.01); H04L 67/10 (2013.01)

(58) Field of Classification Search
CPC ...................................................... G06F 9/44
See application file for complete search history.

(56) References Cited

U.S. PATENT DOCUMENTS

| | | | |
|---|---|---|---|
| 6,862,573 B2 | 3/2005 | Kendall et al. | |
| 8,428,777 B1 * | 4/2013 | Poursohi .......... | G05B 19/41865 700/247 |
| 9,614,784 B1 * | 4/2017 | Houston .............. | H04L 47/822 |
| 2001/0056362 A1 | 12/2001 | Hanagan et al. | |
| 2002/0138321 A1 * | 9/2002 | Yuan ...................... | G06Q 10/10 705/80 |
| 2006/0026049 A1 | 2/2006 | Joseph et al. | |
| 2018/0239646 A1 * | 8/2018 | Yamakawa ............... | G06F 9/46 |

* cited by examiner

Primary Examiner — Jae U Jeon
(74) Attorney, Agent, or Firm — Finnegan, Henderson, Farabow, Garrett & Dunner, LLP

(57) ABSTRACT

This disclosure relates to automating execution of operational tasks in an enterprise network. The method includes segregating a plurality of operational tasks into a plurality of task categories. Thereafter, the method includes mapping each of the plurality of operational tasks to at least one operation pattern based on associated task category from the plurality of task categories, in response to the segregating. The method further includes processing at least one of the plurality of operational tasks based on the at least one operation pattern mapped. Based on the processing, the method includes invoking automatically at least one utility to execute each of the at least one operational task.

13 Claims, 5 Drawing Sheets

METHOD AND DEVICE FOR AUTOMATING OPERATIONAL TASKS IN AN ENTERPRISE NETWORK

TECHNICAL FIELD

This disclosure relates generally to managing operational tasks in an enterprise network and more particularly to method and device for automating operational tasks in an enterprise network.

BACKGROUND

In a customer centric communications stack for optimal Operational Expenditure (OPEX) that runs twenty-four by seven, there is a very high manual dependency. On an average, fifty percent of operational tasks are manual and repetitive that are spread across various areas, for example, business requests, Standard Operating Procedure (SOP)/scripts execution, and dashboards or reports. These manual operational tasks not only consume resource bandwidth, but also have an impact on delivering consistent predictive results and customer experience due to variations in manual handlings and human errors. These manual interventions become more complex, time consuming, and error prone while running operations for convergent billing solution covering mobile, landline, or board-band services in general, considering migrated/legacy customers and new customers.

There is therefore a need for a method and device that would reduce or eliminate manual intervention in order to optimize execution of operational tasks and deliver consistent customer experience.

SUMMARY

In one embodiment, a method for automating execution of operational tasks in an enterprise network is disclosed. The method includes segregating, by an enterprise network device, a plurality of operational tasks into a plurality of task categories; mapping, by the enterprise network device, each of the plurality of operational tasks to at least one operation pattern based on associated task category from the plurality of task categories, in response to the segregating; processing, by the enterprise network device, at least one of the plurality of operational tasks based on the at least one operation pattern mapped; and invoking automatically, by the enterprise network device, at least one utility to execute each of the at least one operational task based on the processing.

In another embodiment, an enterprise network device for automating execution of operational tasks in an enterprise network is disclosed. The enterprise network device includes a processor; and a memory communicatively coupled to the processor, wherein the memory stores processor instructions, which, on execution, causes the processor to segregate a plurality of operational tasks into a plurality of task categories; map each of the plurality of operational tasks to at least one operation pattern based on associated task category from the plurality of task categories, in response to the segregating; process at least one of the plurality of operational tasks based on the at least one operation pattern mapped; and invoke at least one utility to execute each of the at least one operational task based on the processing.

In yet another embodiment, a non-transitory computer-readable storage medium is disclosed. The non-transitory computer-readable storage medium has instructions stored thereon, a set of computer-executable instructions causing a computer comprising one or more processors to perform steps comprising segregating, by an enterprise network device, a plurality of operational tasks into a plurality of task categories; mapping, by the enterprise network device, each of the plurality of operational tasks to at least one operation pattern based on associated task category from the plurality of task categories, in response to the segregating; processing, by the enterprise network device, at least one of the plurality of operational tasks based on the at least one operation pattern mapped; and invoking automatically, by the enterprise network device, at least one utility to execute each of the at least one operational task based on the processing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
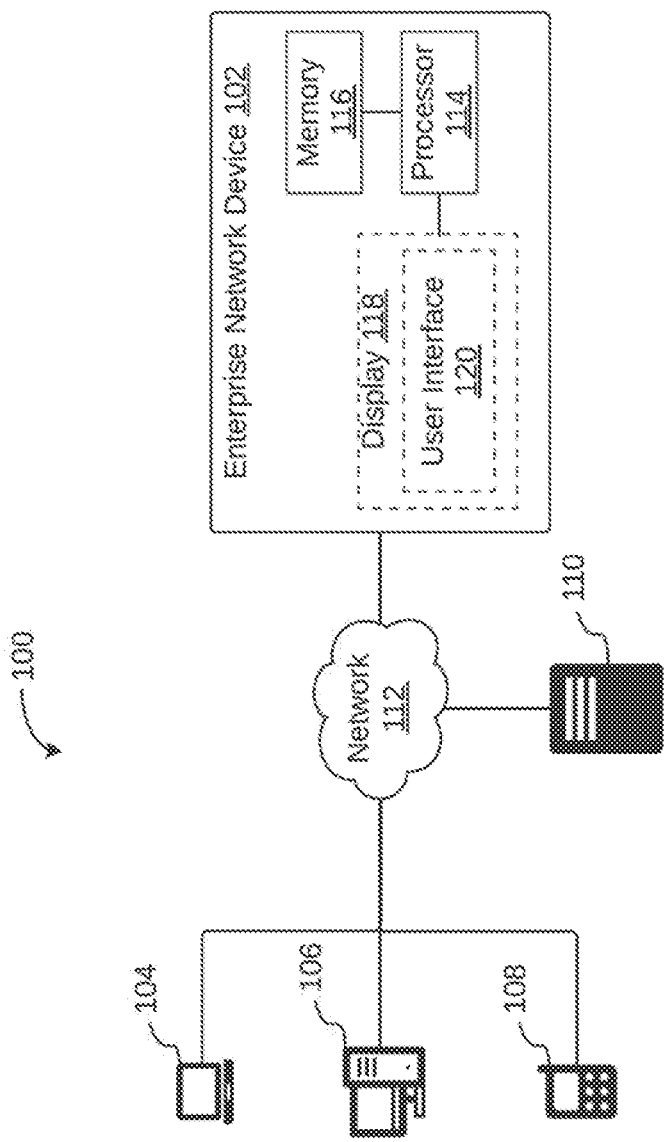
FIG. 1 illustrates an enterprise network in which various embodiments may function.

Additional illustrative embodiments are listed below. In one embodiment, an enterprise network 100 (that is exemplary) in which various embodiments may function is illustrated in FIG. 1. Enterprise network 100 includes an enterprise network device 102 that communicates with a plurality of external devices (for example, a laptop 104, a desktop 106, a mobile device 108, and a server 110) via a network 112. The plurality of external devices may be used by customers availing services provided by an organization associated with enterprise network 100. Other examples of external devices may include, but are not limited to a Voice Over IP (VOIP) based device, a tablet, a phablet, and an application server. Network 112 may be a wireless or a wireline network.

One or more customers using the plurality of external devices may communicate with enterprise network device 102 to register service requests and avail services provided within enterprise network 100 via any form of messaging, for example, email supported by enterprise network 100. The service requests, for example, may include, but are not limited to requesting billing records associated with a customer at regular intervals, providing payment receipts via email, populating payment records in a customer account, bulk update of collection exemption/inclusion, bulk collection scenario replacements, bulk pre-activations, bulk disconnections, and bulk BAR/UNBAR of customer Mobile Station International Subscriber Directory Numbers (MSISDNs). Enterprise network device 102 processes these service requests in order to address or resolve them by automating execution of operational tasks associated with these service requests within enterprise network 100 through a framework. Automation of operational tasks ensures that customer's service requests are resolved efficiently ensuring good and consistent customer experience.

Enterprise network device 102 includes a processor 114 that is communicatively coupled to a memory 116. Memory 116 further includes various modules that function as a framework and enable enterprise network device 102 to automate execution of operational tasks within enterprise network 100. This is explained in detail in conjunction with FIG. 2. Enterprise network device 102 may further include a display 118 having a User Interface (UI) 120 that may be used by a user to interact with enterprise network device 102. Display 120 may further be used to display reports that include results of automating the operational tasks.

Figure 2:
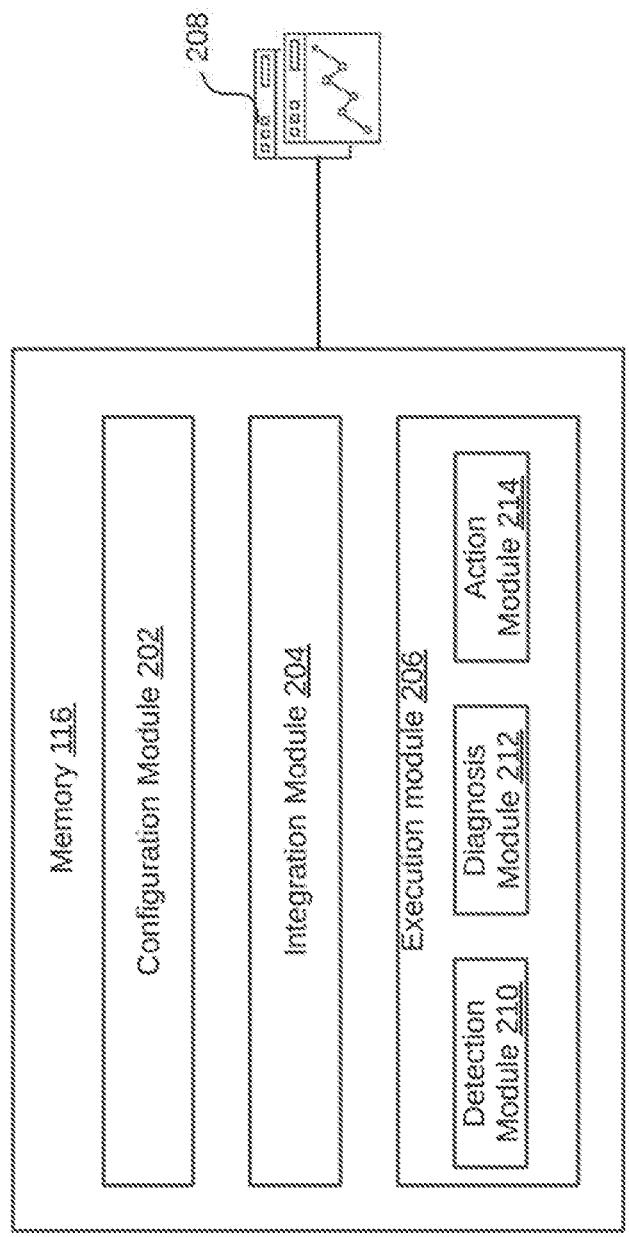
FIG. 2 is a block diagram illustrating various modules in a memory of an enterprise network device configured to automate execution of operational tasks in an enterprise network, in accordance with an embodiment.

Referring now to FIG. 2, a block diagram of various modules stored in memory 116 of enterprise network device 102 configured to automate execution of operational tasks in an enterprise network is illustrated, in accordance with an embodiment. Memory 116 includes a configuration module 202, an integration module 204, and an execution module 206. Configuration module 202 identifies a plurality of operational tasks that are either manual or semi-automated across entire Business Support System (BSS) stack or Operation Support System (OSS) stack within the enterprise network. Configuration module 202 may extract the plurality of operational tasks from a process map of a Standard Operating Procedure (SOP) manual or a Workflow available in the enterprise network using a process description language analyzer. In other words, granular steps from the process map are identified by the enterprise network device.

Configuration module 202 also configures a plurality of task categories that may include, but are not limited to reporting/dashboard generation, regular basis Bulk request/SOP handling, ad-hoc bulk request, scheduling of bulk request received once from business, triggering of workflow with multiple steps, triggering of workflow with multiple steps with approval, manual process intervention across various components in the stack. The plurality of task categories are used to categorize operational tasks within the enterprise network. In other words, an operational task within the enterprise network is bucketed into one or more task categories.

Configuration module 202 enables a user or administrator of the enterprise network to modify the number of task categories and the type of task categories that would be considered to segregate the plurality of operational tasks. In an embodiment, these task categories may be selected from a historical database of such task categories. A user may be able to select the task categories that he wants to include for segregation of the plurality of operational tasks from a drop-down menu. Configuration module 202 also defines a plurality of operation patterns, such that, each task category is mapped to an operation pattern. The mapping of a task category to an operation pattern may be done using keyword matching or other similar algorithms. Thus, when seven task categories are identified, then seven associated operation patterns are also identified.

Configuration module 202 thus enables a user to define the list of operational tasks that are required to be automated and schedule automation of these operational tasks adaptively. The automations may include, but are not limited to reporting, auto mailer based request execution, and ad hoc requests. Based on mapping of an operational task to an operation pattern, configuration module 202 also defines the security protocols that are required (via integration module 204), scripts or utilities that should be invoked (via execution module 206), and the end application or end device that would execute the operational task.

Configuration module 202 may also configure a mail detection script (not shown in FIG. 2) and task detection script (not shown in FIG. 2). The mail detection script enables reading content of an email and the task detection script derives an operational task out of the email content. The task detection script also determines schedule associated with the operational task. The schedule associated with an operational task, for example, may include executing an operational task multiple times within a day after fixed predefined intervals. Once an operational task has been executed, configuration module 202 also configures a reporting script that gathers results associated with automation of these operational tasks and subsequently configures presentation or delivery of these results in form of a report 208 to a desired destination, which may be an end device of a user. After defining these configuration rules, configuration module 202 may store these configuration rules in a configuration rules database (not shown in FIG. 2).

Integration module 204 enables enterprise network device 102 to support various security protocols, for example, Secure Shell (SSH), Secure File Transfer Protocol (SFTP), Java Database Connectivity (JDBC), and Open Database Connectivity (ODBC), and thus enables seamless connectivity of enterprise network device 102 to the source/target hosts in the enterprise network or the operational environment. Integration module 204 thus abstracts a user from the underlying system used to execute an operational task.

Execution module 206 provides a shell to plug-in the actual scripts or utilities that will be invoked for automation of operational tasks. To this end, a detection module 210 first specifies validation or any pre-requisites that may be required, before execution of any operational task. Examples of validation or pre-requisites include, but are not limited to: doing a database update of the customer state before running SOP, if customer's MSISDN is active in system; ensuring that a billing process is completed for the day before the MSISDNs for which notification is to be sent is to be extracted; and ensuring the daily job is completed before extracting the fallout records on which SOP is to be applied. Thereafter, for any incoming emails, detection module 210 first retrieves data regarding the content and context of the emails from the mail detection script in order to detect an operational task. Detection module 210 then communicates with the task detection script to determine a schedule associated with that operational task. For example, whether the operational task needs to be executed once or multiple times within a day or a week after fixed predefined intervals.

Once an operational task and an associated schedule has been detected, a diagnosis module 212 uses this data and matches it with configuration rules saved in the configuration rules database to determine the task category and one or more operation patterns mapped to that task category. Thus, diagnosis module 212 identifies one or more operation patterns associated with the operational task detected from an email. Diagnosis module 212 also identifies the primary operation pattern that is associated with operational task from amongst the one or more operation patterns.

An action module 214 thereafter uses the information regarding the primary operation pattern and the configuration rules saved in the configuration rules database to determine the utility, script, or SOP that should be invoked, via integration module 204, to execute the operational task by interfacing with an end device or an application. Action module 214 also enables extraction of the output of automatically executing the operational tasks and creates a result summary using the reporting script configured by configuration module 202 to create report 208 or present the result summary on a dashboard being viewed by the user on his/her device.

The framework thus automates execution of manual or semi-automatic operational tasks in the enterprise network. The framework is applicable to any communication stack that may include one or more associated applications and is independent of the vendor or platform used by the vendor. As the framework allows dynamic pattern driven automation, the probability to automate a task becomes an exponential function rather than a liner function. Also, the framework thus covers a huge list of operational tasks that can be automated and is not limited to a set of hard coded transactions.

Figure 3:
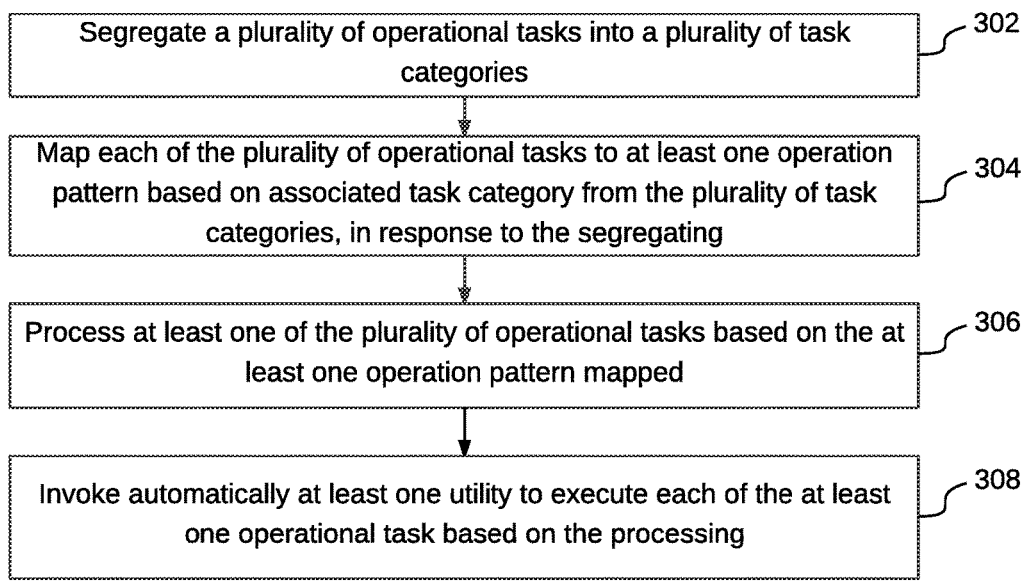
FIG. 3 illustrates a flowchart of a method to automate execution of operational tasks in an enterprise network, in accordance with an embodiment.

Referring now to FIG. 3, a flowchart of a method for automating execution of operational tasks in an enterprise network is illustrated, in accordance with an embodiment. To this end, an enterprise network device identifies a plurality of operational tasks that are either manual or semi-automated across the stack covering entire BSS stack or OSS stack within the enterprise network. The plurality of operational tasks may be extracted from a process map of an SOP manual or a Workflow available in the enterprise network using a process description language analyzer. In other words, granular steps from the process map are identified by the enterprise network device.

Thereafter, at 302, the enterprise network device segregates the plurality of operational tasks into a plurality of task categories. In an embodiment, the plurality of task categories may include, but are not limited to the following seven task categories: reporting/dashboard generation, regular basis bulk request/SOP handling, ad-hoc bulk request, scheduling of bulk request received once from business, triggering of workflow with multiple steps, triggering of workflow with multiple steps with approval, manual process intervention across various components in the stack. A user or administrator of the enterprise network may modify the number of task categories and the type of task categories that would be considered to segregate the plurality of operations. In an embodiment, these task categories may be selected from a historical database of such task categories. A user may be able to select the task categories that he wants to include for segregation of the plurality of operational tasks from a drop down menu.

Based on the plurality of task categories, a plurality of operation patterns are also identified, such that, each task category has an operation pattern mapped to it. The mapping of a task category to an operation pattern may be done using keyword matching or other similar algorithms. Thus, when seven task categories are identified, then seven associated operation patterns are also identified. Thereafter, at 304, the enterprise network device maps each of the plurality of operational tasks to one or more operation patterns based on associated task category from the plurality of task categories. An operation pattern enables automation of an operational task that is categorized into a particular task category, which the operation pattern is associated with. It is ensured that each granular step or operational task in the entire process map is mapped to a relevant primary pattern, in order to achieve automation of the entire process map. In an embodiment, a database of such historic mapping may be maintained and any modifications in the mapping made by a user may also be recorded for future refinement of this mapping. In an exemplary embodiment, mapping of a task category to one or more relevant operation patterns is represented using table 1 given below:

TABLE 1

| Task Category | Operation Pattern |
| --- | --- |
| Reporting/dashboard generation | Model View Controller (MVC) dashboard automation |
| Regular basis Bulk request/SOP | Auto mailer detection automation |
| Ad hoc bulk request | Ad hoc file bad automation |
| Scheduling of bulk request received once from business | Load once and execute daily automation |
| Triggering of workflow with multiple steps | Load file and workflow trigger automation |
| Triggering of workflow with multiple steps with approval | Load file and approval and workflow trigger automation |
| Manual process intervention across various components in the stack | Process monitoring and process control automation |

The framework thus provides an adaptive and flexible environment that utilizes the relevant operation pattern to configure, integrate, and execute automation of an operational task. The framework dynamically and intelligently decides one or more operation patterns that are relevant for automating an operational task, based on a task category that the operational task is categorized into. The framework also enables maximum re-use of existing scripts/utilities/SOPs by triggering them when required and by integrating with various stack applications and supporting applications.

Once each operational task is mapped to an operation pattern, the enterprise network device, at 306, processes each of the plurality of operational tasks based on the one or more operation patterns it is mapped to. In order to process an operational task, task information associated with the operational task is received from an automated scheduled task detection utility. This information is then diagnosed to identify the operational task. Based on the processing, the enterprise network device automatically invokes one or more utilities to execute each of the one or more operational tasks at 308. In other words, when an operational task is matched with an operation pattern, then different steps of the detection, diagnosis, and action are performed in order to automate the operational task. This has been explained in detail in conjunction with FIG. 2 given above.

Figure 4:
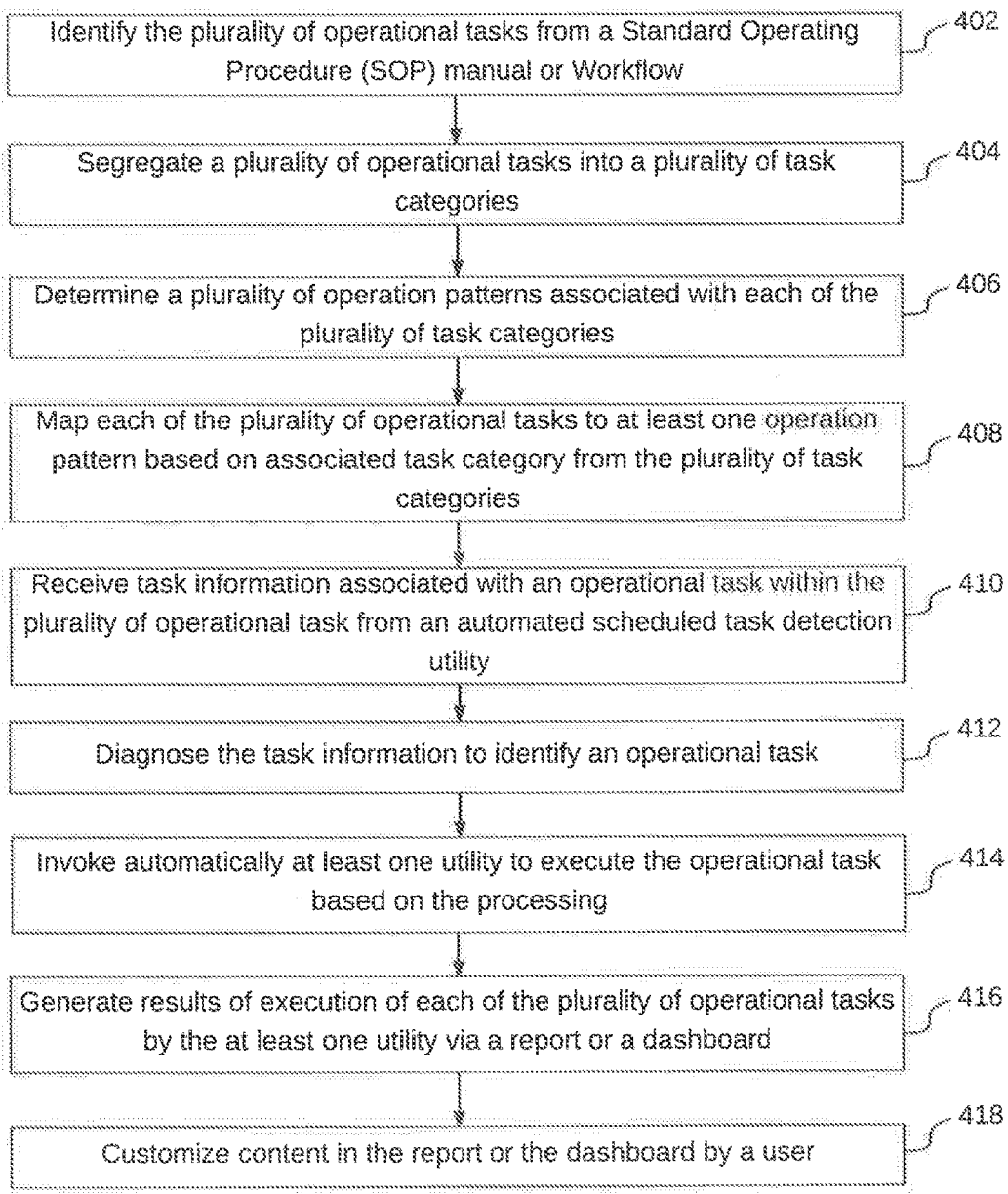
FIG. 4 illustrates a flowchart of a method to automate execution of operational tasks in an enterprise network, in accordance with another embodiment.

Referring now to FIG. 4, a flowchart of a method for automating execution of operational tasks in an enterprise network is illustrated, in accordance with another embodiment. At 402, a plurality of operational tasks are identified from an SOP manual or Workflow. Thereafter, the plurality of operational tasks are segregated into a plurality of task categories at 404. At 406, a plurality of operation patterns associated with each of the plurality of task categories are determined. This has been explained in detail in conjunction with FIG. 2 and FIG. 3. At 408, each of the plurality of operational tasks are mapped to one or more operation patterns based on associated task category from the plurality of task categories. At 410, task information associated with an operational task within the plurality of operational task is received from an automated scheduled task detection utility or script. The task information is diagnosed, at 412, to identify an operational task. Thereafter, at 414, one or more utilities are automatically invoked to execute the operational task based on the processing. Results of executing the operational task is then generated by the one or more utilities via a report or a dashboard at 416. A user may customize content in the report or the dashboard at 418. This has been explained in detail in conjunction with FIG. 5.

Figure 5:
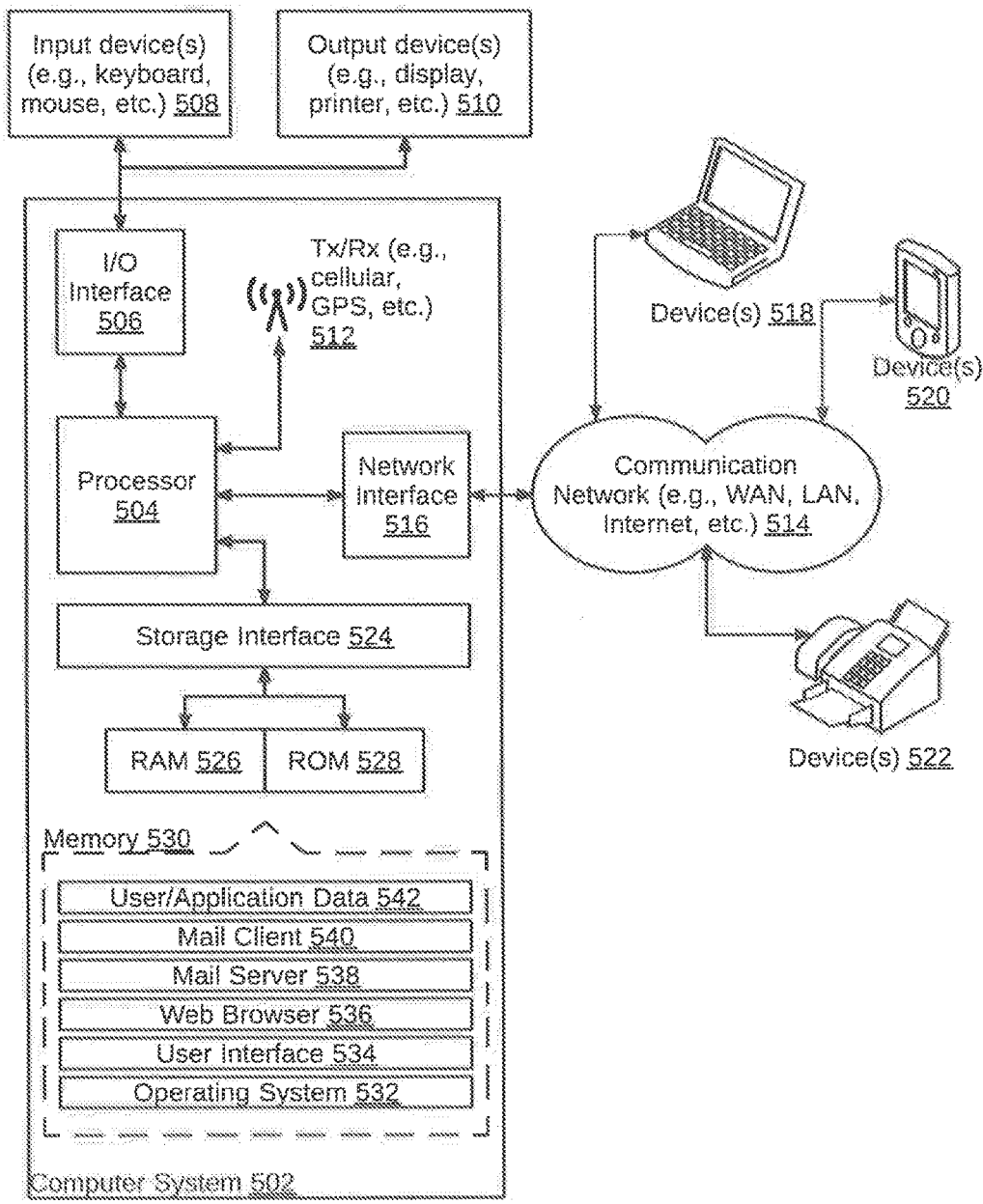
FIG. 5 illustrates a block diagram of an exemplary computer system for implementing various embodiments.

FIG. 5 is a block diagram of an exemplary computer system for implementing various embodiments. Computer system 502 may comprise a central processing unit ("CPU" or "processor") 504. Processor 504 may comprise at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., Texas Instruments WiLink WL1283, Broadcom BCM4550IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, a user interface 534, a web browser 536, a mail server 538, a mail client 540, a user/application data 542 (e.g., any data variables or data records discussed in this disclosure), etc. Operating system 532 may facilitate resource management and operation of computer system 502. Examples of operating system 532 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 502 may implement web browser 536 stored program component. Web browser 536 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 502 may implement mail server 538 stored program component. Mail server 538 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement mail client 540 stored program component. Mail client 540 may be a mail viewing application, such as Apple Mail, Microsoft Entourage, Microsoft Outlook, Mozilla Thunderbird, etc.

In some embodiments, computer system 502 may store user/application data 542, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide a method and device for automating operational tasks in an enterprise network. The method and device provide an automation framework that automates execution of manual or semi-automatic operational tasks in the enterprise network. This framework is applicable to any communication stack that may include one or more associated applications and is independent of the vendor or platform used by the vendor. As the framework allows dynamic pattern driven automation, the probability to automate a task becomes an exponential function rather than a liner function. Also, the framework thus covers a huge list of operational tasks that can be automated and is not limited to a set of hard coded transactions.

The specification has described method and device for automating operational tasks in an enterprise network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating execution of operational tasks in an enterprise network, the method comprising:
   identifying a plurality of operational tasks from a Standard Operating Procedure (SOP) manual or workflow by a process description language analyzer;
   segregating, by an enterprise network device, the plurality of operational tasks into a plurality of task categories;
   mapping, by the enterprise network device, each of the plurality of operational tasks to at least one operation pattern based on associated task category from the plurality of task categories, in response to the segregating;
   based on the mapping of each operational task to each operation pattern, defining security protocols to enables seamless connectivity of the enterprise network device to source/target hosts in the enterprise network;
   processing, by the enterprise network device, at least one of the plurality of operational tasks based on the at least one operation pattern mapped; and
   invoking automatically, by the enterprise network device, at least one utility script to execute each of the at least one operational task based on the processing, wherein a shell is provided to plug-in the utility script to be invoked for automation of the operational tasks;
   generating results of execution of each of the plurality of operational task by the at least one utility via a report or a dashboard; and
   customizing content in the report or the dashboard by a user.

2. The method of claim 1, wherein each of the plurality of operational tasks is a non-automated task in the enterprise network.

3. The method of claim 1 further comprising determining a plurality of operation patterns associated with each of the plurality of categories.

4. The method of claim 1, wherein processing comprises receiving task information associated with an operational task within the plurality of operational task from an automated scheduled task detection utility.

5. The method of claim 4, wherein processing comprises diagnosing the task information to identify the operational task.

6. The method of claim 5, wherein invoking of the at least one utility script to execute the operational task is enabled by an execution utility triggered in response to the diagnosing.

7. An enterprise network device for automating execution of operational tasks in an enterprise network, the enterprise network device comprising:
 a processor; and
 a memory communicatively coupled to the processor, wherein the memory stores processor instructions, which, on execution, causes the processor to: segregating, by an enterprise network device, a plurality of operational tasks into a plurality of task categories;
 identify a plurality of operational task from a Standard Operating Procedure (SOP) manual or workflow by a process description language analyzer;
 segregate a plurality of operational tasks into a plurality of task categories;
 map each of the plurality of operational tasks to at least one operation pattern based on associated task category from the plurality of task categories, in response to the segregating;
 based on the mapping of each operational task to each operation pattern, define security protocols to enables seamless connectivity of the enterprise network device to source/target hosts in the enterprise network;
 process at least one of the plurality of operational tasks based on the at least one operation pattern mapped; and
 invoke at least one utility script to execute each of the at least one operational task based on the processing, wherein a shell is provided to PI n the utility script to be invoked for automation of the operational tasks;
 generate results of exaction of each of the plurality of operational task by the at least one utility via a report or a dashboard; and
 customize content in the report or the dashboard by a user.

8. The enterprise network device of claim 7, wherein each of the plurality of operational tasks is a non-automated task in the enterprise network.

9. The enterprise network device of claim 7, wherein the processor instructions further cause the processor to determine a plurality of operation patterns associated with each of the plurality of categories.

10. The enterprise network device of claim 7, wherein the processor instructions further cause the processor to receive task information associated with an operational task within the plurality of operational task from an automated scheduled task detection utility.

11. The enterprise network device of claim 10, wherein the processor instructions further cause the processor to diagnose the task information to identify the operational task.

12. The enterprise network device of claim 11, wherein invoking of the at least one utility script to execute the operational task is enabled by an execution utility triggered in response to the diagnosing.

13. A non-transitory computer-readable storage medium having stored Thereon, a set of computer-executable instructions causing a computer comprising one or more processors to perform steps comprising:
 identifying a plurality of operational tasks from a Standard Operating Procedure (SOP) manual or workflow by a process description language analyzer;
 segregating, by an enterprise network device, a plurality of operational tasks into a plurality of task categories;
 mapping, by the enterprise network device, each of the plurality of operational tasks to at least one operation pattern based on associated task category from the plurality of task categories, in response to the segregating;
 based on the mapping of each operational task to each operation pattern, defining security protocols to enables seamless connectivity of the enterprise network device to source/target hosts in the enterprise network;
 processing, by the enterprise network device, at least one of the plurality operational tasks based on the at least one operation pattern mapped; and
 invoking automatically, by the enterprise network device, at least one utility script to execute each of the at least one operational task based on the processing, wherein a shell is provided to plug-in the utility script to be invoked for automation of the operational tasks;
 generating results of execution of each of the plurality of operational tasks by the at least one utility via a report or a dashboard; and
 customizing content in the report or the dashboard a user.

* * * * *